US010117170B2

(12) United States Patent
Yi et al.

(10) Patent No.: US 10,117,170 B2
(45) Date of Patent: Oct. 30, 2018

(54) METHOD AND AN APPARATUS OF WIRELESS COMMUNICATION

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 10 days.

(21) Appl. No.: 15/109,618

(22) PCT Filed: Jan. 8, 2015

(86) PCT No.: PCT/KR2015/000200
§ 371 (c)(1),
(2) Date: Jul. 1, 2016

(87) PCT Pub. No.: WO2015/105353
PCT Pub. Date: Jul. 16, 2015

(65) Prior Publication Data
US 2016/0330680 A1 Nov. 10, 2016

Related U.S. Application Data

(60) Provisional application No. 61/925,194, filed on Jan. 8, 2014, provisional application No. 61/929,933, filed on Jan. 21, 2014.

(51) Int. Cl.
*H04W 4/00* (2018.01)
*H04W 48/20* (2009.01)
(Continued)

(52) U.S. Cl.
CPC ........... *H04W 48/20* (2013.01); *H04W 48/16* (2013.01); *H04W 76/15* (2018.02);
(Continued)

(58) Field of Classification Search
None
See application file for complete search history.

(56) References Cited

U.S. PATENT DOCUMENTS 9,258,809 B2 * 2/2016 Liao .................. H04W 36/08
9,319,909 B2 * 4/2016 Yamada ............. H04W 24/08
(Continued)

FOREIGN PATENT DOCUMENTS

WO 2013081293 A1 6/2013
WO 2013151394 A1 10/2013

OTHER PUBLICATIONS

Nsn et al., "On the need of PCell functionality in SeNB", 3GPP TSG-RAN WG2 Meeting #84, R2-134188, Nov. 1, 2013, 4 pages.
(Continued)

*Primary Examiner* — Bob A Phunkulh
(74) *Attorney, Agent, or Firm* — Lee, Hong, Degerman, Kang & Waimey

(57) ABSTRACT

Methods and apparatuses of wireless communication in DC environment are provides. configured with a PCell and a SCell. An embodiment of the present invention is a method for a method of wireless communication configured with a PCell and a SCell. The method comprises receiving information on downlink channel from the PCell, configuring the SCell using the information received from the PCell, and transmitting information on uplink channel.

12 Claims, 9 Drawing Sheets

(51) Int. Cl.
  *H04W 48/16* (2009.01)
  *H04W 76/15* (2018.01)
  *H04W 56/00* (2009.01)
  *H04W 84/02* (2009.01)
  *H04W 88/06* (2009.01)

(52) U.S. Cl.
  CPC .......... *H04W 56/001* (2013.01); *H04W 84/02* (2013.01); *H04W 88/06* (2013.01)

(56) References Cited

U.S. PATENT DOCUMENTS

| | | | | |
|---|---|---|---|---|
| 2012/0257513 A1* | 10/2012 | Yamada | ................ | H04L 1/0618 370/248 |
| 2012/0275390 A1* | 11/2012 | Korhonen | ........... | H04W 74/006 370/329 |
| 2012/0281548 A1* | 11/2012 | Lin | ...................... | H04W 36/30 370/242 |
| 2012/0300714 A1* | 11/2012 | Ng | .................... | H04W 56/0045 370/329 |
| 2012/0300715 A1* | 11/2012 | Pelletier | ............ | H04W 56/0005 370/329 |
| 2013/0010711 A1* | 1/2013 | Larsson | ............ | H04W 56/0005 370/329 |
| 2013/0083739 A1* | 4/2013 | Yamada | .............. | H04W 74/006 370/329 |
| 2013/0188473 A1* | 7/2013 | Dinan | ............... | H04W 56/0005 370/216 |
| 2013/0188580 A1* | 7/2013 | Dinan | ................ | H04W 52/281 370/329 |
| 2013/0188612 A1* | 7/2013 | Dinan | .............. | H04W 56/0005 370/336 |
| 2013/0250911 A1* | 9/2013 | Kwon | .................. | H04W 56/00 370/331 |
| 2013/0258958 A1* | 10/2013 | Dinan | .............. | H04W 56/0045 370/329 |
| 2013/0258959 A1* | 10/2013 | Dinan | .................. | H04W 56/00 370/329 |
| 2013/0259008 A1* | 10/2013 | Dinan | ................ | H04W 56/001 370/336 |
| 2013/0260735 A1* | 10/2013 | Dinan | .............. | H04W 72/0406 455/418 |
| 2013/0272230 A1* | 10/2013 | Dinan | ................... | H04W 52/18 370/329 |
| 2013/0272231 A1* | 10/2013 | Dinan | ................... | H04W 52/34 370/329 |
| 2013/0272232 A1* | 10/2013 | Dinan | ................. | H04W 52/386 370/329 |
| 2013/0272233 A1* | 10/2013 | Dinan | ............... | H04W 72/0406 370/329 |
| 2013/0279435 A1* | 10/2013 | Dinan | ............... | H04W 56/0005 370/329 |
| 2014/0056243 A1* | 2/2014 | Pelletier | ................ | H04W 74/04 370/329 |
| 2014/0078989 A1* | 3/2014 | Guo | .................. | H04W 72/0426 370/329 |
| 2014/0080490 A1* | 3/2014 | Bergstrom | ........ | H04W 56/0005 455/437 |
| 2014/0086173 A1* | 3/2014 | Sadeghi | .................. | H04L 5/005 370/329 |
| 2014/0146907 A1* | 5/2014 | Kim | ..................... | H04B 7/0413 375/267 |
| 2014/0171091 A1* | 6/2014 | Cai | ........................ | H04W 48/20 455/450 |
| 2014/0198767 A1* | 7/2014 | Heo | ................... | H04W 36/023 370/331 |
| 2014/0233542 A1* | 8/2014 | Bergstrom | ............ | H04L 5/0085 370/336 |
| 2014/0242989 A1* | 8/2014 | Cai | ........................ | H04W 52/54 455/436 |
| 2014/0286243 A1* | 9/2014 | Yamada | ............... | H04W 76/025 370/329 |
| 2014/0321406 A1* | 10/2014 | Marinier | ................ | H04B 7/024 370/329 |
| 2015/0173047 A1* | 6/2015 | Yamada | .............. | H04W 72/042 370/329 |
| 2015/0173120 A1* | 6/2015 | Yamada | ............ | H04W 36/0072 370/331 |
| 2015/0341148 A1* | 11/2015 | Kazmi | .................. | H04L 5/0098 370/252 |
| 2016/0050652 A1* | 2/2016 | Wu | ........................ | H04L 5/001 370/329 |

OTHER PUBLICATIONS

Alcatel-Lucent et al., "Dual connectivity configuration: framework", 3GPP TSG RAN WG2 Meeting #84, R2-134377, Nov. 2, 2013, 3 pages.

\* cited by examiner

METHOD AND AN APPARATUS OF WIRELESS COMMUNICATION

CROSS-REFERENCE TO RELATED APPLICATIONS

This application is the National Stage filing under 35 U.S.C. 371 of International Application No. PCT/KR2015/000200, filed on Jan. 8, 2015, which claims the benefit of U.S. Provisional Application Nos. 61/925,194, filed on Jan. 8, 2014 and 61/929,933, filed on Jan. 21, 2014, the contents of which are all hereby incorporated by reference herein in the entirety.

TECHNICAL FIELD

This invention relates to wireless communication, more specifically to techniques for operating under dual connectivity (DC) environment.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE. The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In order to handle increasing data traffic, various techniques are being introduced to enhance transmitting capacity. For example, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency. A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

In this circumstances, different types of cells are used for enhance the performance of wireless communication. For example, user equipment can transmits/receives signals with a plurality of eNB.

SUMMARY OF INVENTION

Technical Problem

An object of the present invention is to provide method and apparatus for SCell configuration and reconfiguration in DC environment.

Another object of the present invention is to provide method and apparatus for reporting RLM, performing measurement on RS, etc.

Another object of the present invention is to provide method and apparatus for aperiodic CSI triggering and configuration.

Technical Solution

An embodiment of the present invention is a method for a method of wireless communication configured with a PCell and a SCell. The method comprises receiving information on downlink channel from the PCell, configuring the SCell using the information received from the PCell, and transmitting information on uplink channel.

Another embodiment of the present invention is an apparatus for an apparatus for communication configured with a PCell and a SCell. The apparatus comprises a radio frequency (RF) unit for transmitting and receiving a radio signal and a processor operatively coupled to the RF unit, wherein the processor is configured for transmitting signals via the RF unit based on a scheduling for UL and/or DL, wherein the processor configures the SCell using information received from the PCell.

Advantageous Effects

According to the present invention, the UE and Cells can establish between them efficiently in DC environment.

According to the present invention, the Cells can share information efficiently with each other in DC environment.

According to the present invention, reporting configuration for various cases can be done efficiently in DC environment.

MODE FOR INVENTION

Figure 1:
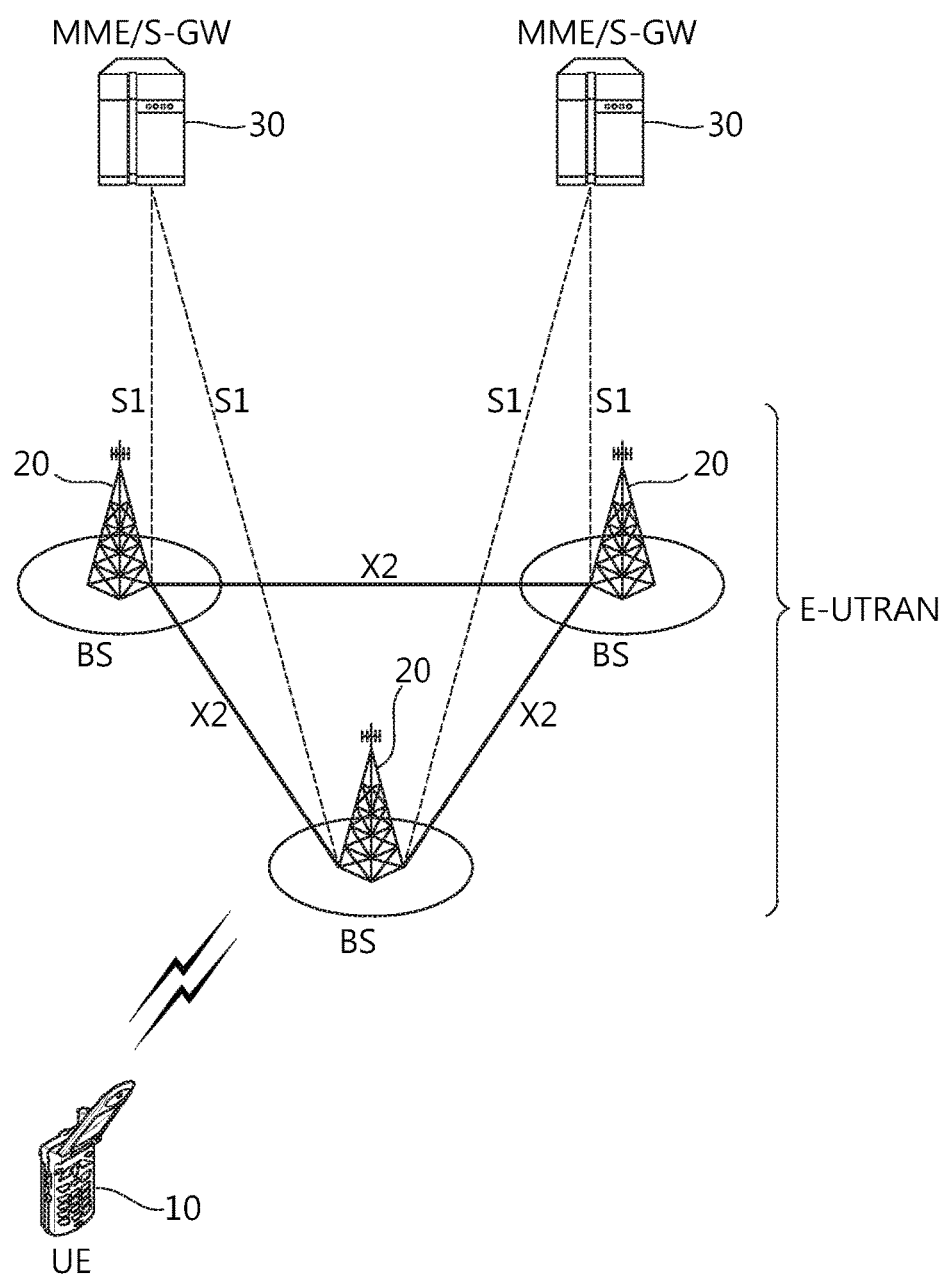
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U. The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel. Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network. The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
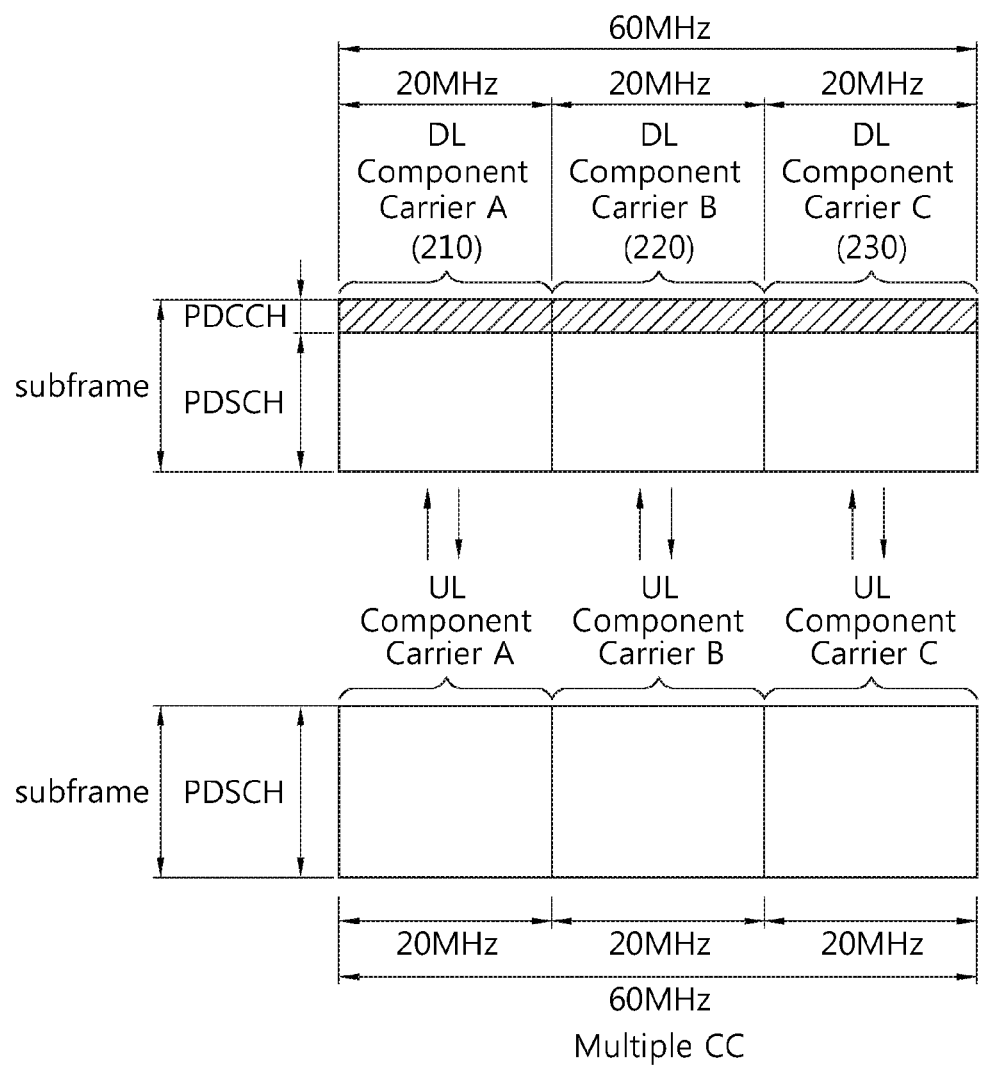
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M<N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell)

is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell. To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell or pSCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
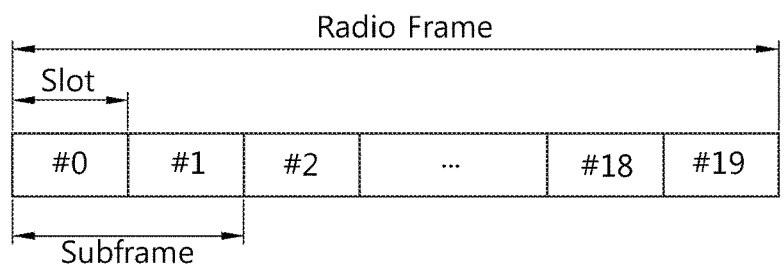
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms. One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc.

A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE.

Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
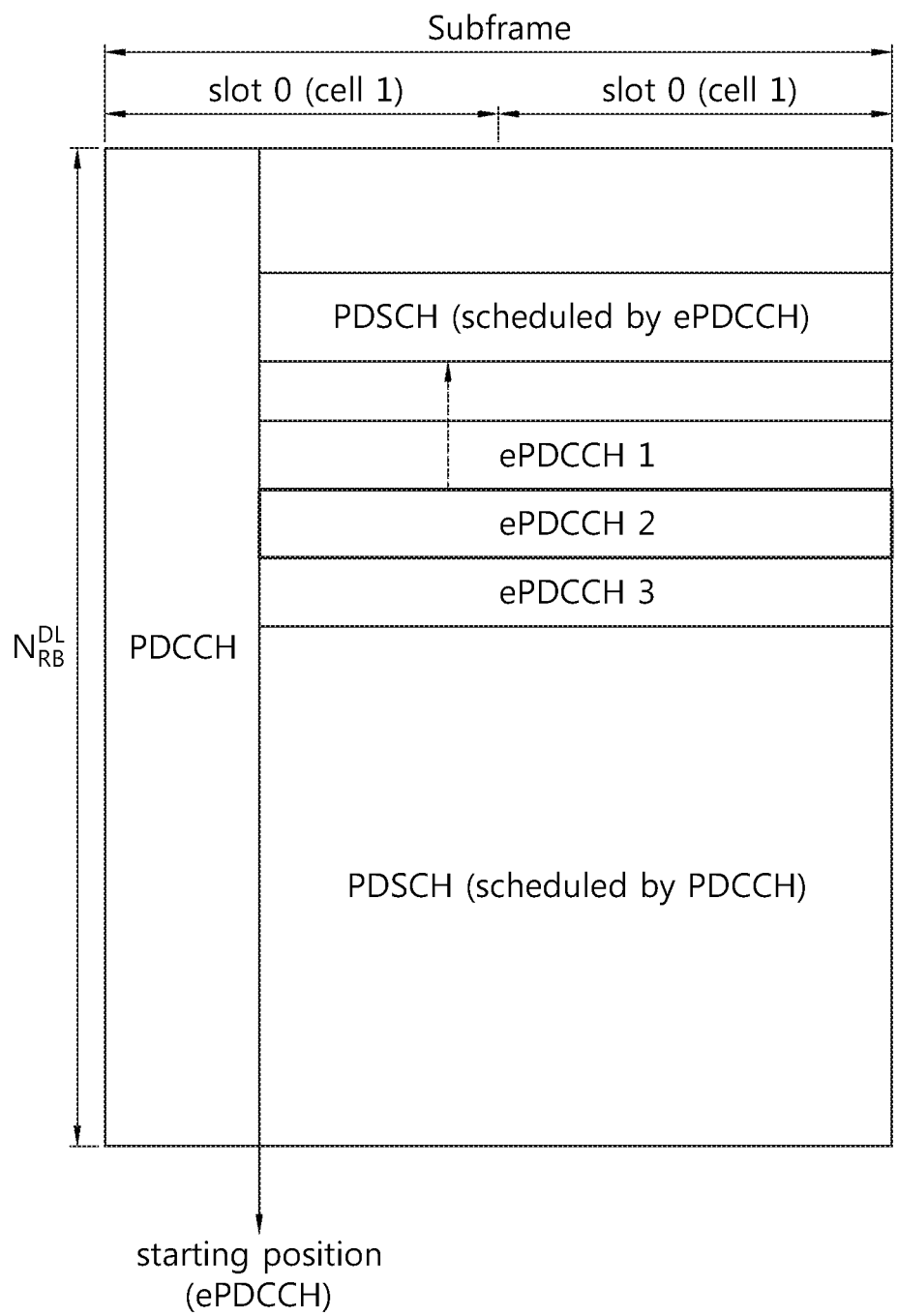
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple SCells of the CA.

Referring to FIG. 4, the UE can monitor a plurality of PDCCH/ePDCCHs within the control region and/or data region. While EPDCCH is transmitted in UE specific search space, PDCCH can be transmitted in common search space as well as in UE specific search space. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling.

Figure 5:
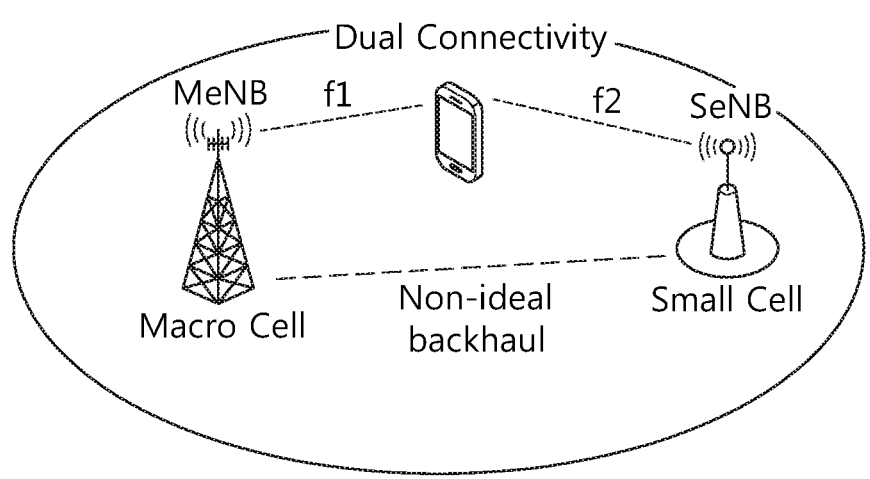
FIG. 5 shows an example of dual connectivity to a macro cell and a small cell.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data. In the dual connectivity, the UE may be configured with one carrier group per each eNB in which all the carriers are configured with one PUCCH carrier where all HARQ-ACK and feedback are transmitted from carriers configured by one eNB.

Figure 6:
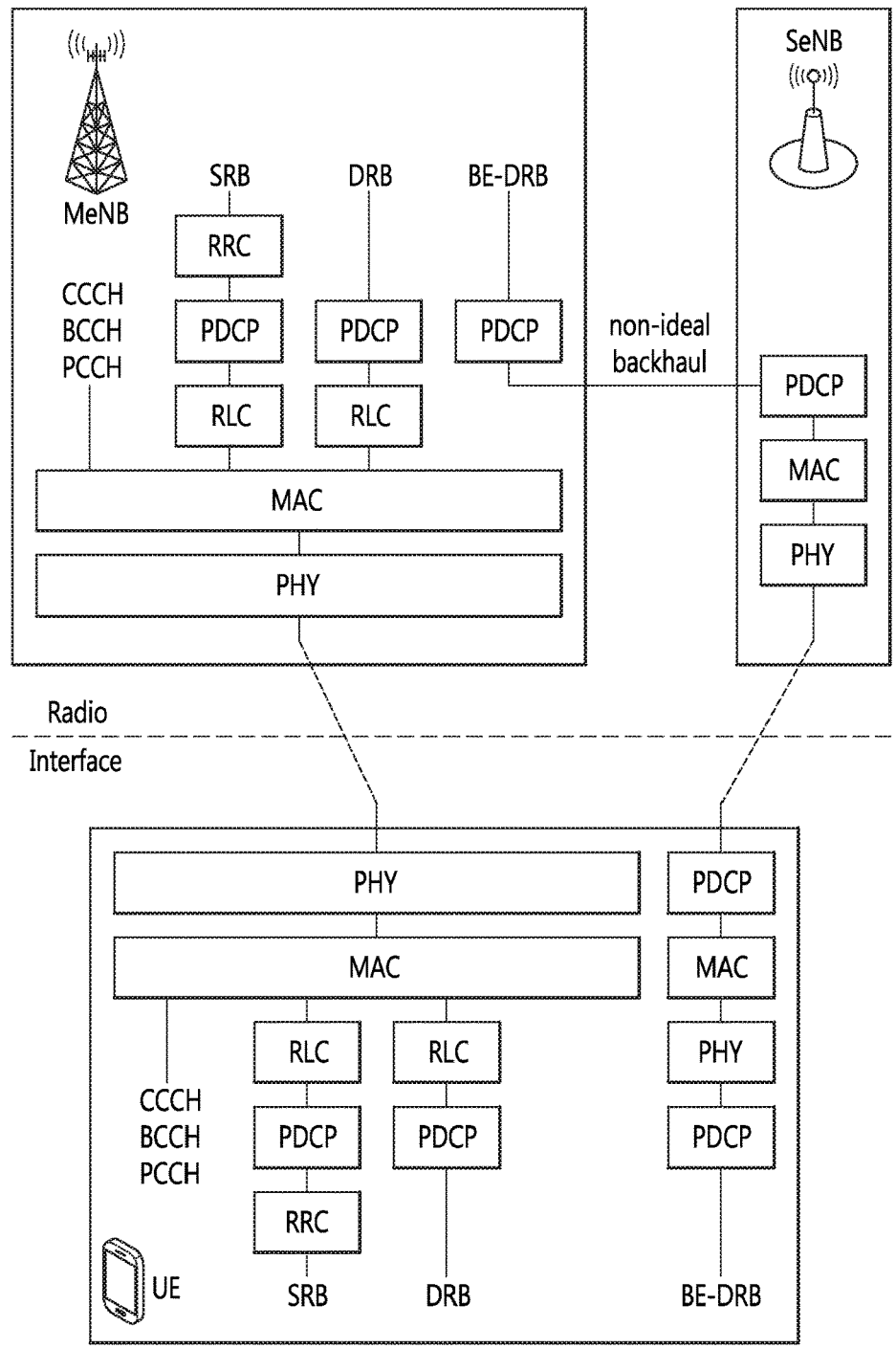
FIG. 6 shows an example of a protocol architecture supporting dual connectivity.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the MAC entity is setup for each eNB (i.e., the MeNB and SeNB).

Meanwhile, aggregation for a plurality of cells (carrier aggregation: CA) is support in LTE-A, all cells which are aggregated for one UE is controlled by one eNB. This may be called as intra-site CA.

In this intra-site CA, signaling related to RRC configuration/report, MAC command/message, etc can be done with any cell among aggregated cells since all the cells are controlled by one eNB.

For example, signaling for a process to allocate or disallocate a specific SCell to CA cell set additionally, a process to exchange a transmission mode (i.e. TM) of a specific cell, a process to perform RRM measurement report for a specific cell, etc. can be performed by any cell among aggregated cells.

For another example, a process for activating/deactivating a specific cell, a signaling along with buffer status report (BSR) for managing UL buffer can be performed by any cell among aggregated cells. In addition, power headroom report (PHR) per a cell for UL power control, TA command (TAC) per TA group (TAG) for RL synchronization control also can be signaled through any cell in CA cell set.

It can be considered such a circumstance that cells with a small coverage (i.e. micro cells) are mixed and deployed in a cell with a large coverage for traffic optimization in next generation system after LTE-A.

In this case, a UE may use a macro cell for mobility management mainly (e.g. PCell) and a micro cell for throughput boosting mainly (e.g SCell) with the two cells aggregated. However, the aggregated cells can be controlled by different eNBs (or corresponding node such as relay) which are geometrically far away each other since coverage of each aggregated cell may be different for each other. This can be called as inter-site CA.

For inter-site CA situation and UEs for inter-site CA, it can be considered that eNB of managing UE's PCell may control radio resource control and management (e.g. whole RRC performances and a part of MAC performances) and eNB of managing each cell may control data scheduling for each cell and feedback processes (e.g. whole PHY performances and main performances of MAC), etc.

Accordingly, information/data communication/transmission between cells (i.e. between eNBs) needs to be performed via cable X2 interface or wireless backhaul (i.e. BH), etc. in a view of supporting CA for a UE. However, it may be possible to significantly reduce safety of cell management, efficiency of resource control, etc by latency occurred in data/information signaling between eNBs via X2 or BH when the existing signaling method is just applied as it is. Hereinafter, disclosure provides methods and apparatus can be applied to inter-site CA and/or intra-site CA considering such concerns.

In small cell environments, to reduce UE power consumption due to RRM measurement, cell search, etc, introducing a discovery signal is considered. The discovery signal may be transmitted with or without existing synchronization channel. And the discovery signal may be transmitted in both active and inactive state or may be transmitted only in inactive state.

Particularly, with densely deployed small cells, dual connectivity where a UE is connected to more than one eNB at the same time is considered. Some use cases of dual connectivity include split of C-Plane and U-Plane where C-Plane is served by macro layer whereas U-Plane is served by small cell layer, inter-node resource aggregation, RRC diversity and so on.

With low operating and management cost, it is desirable to deploy small cells autonomously rather than based on pre-planning. Moreover, backhaul between macro cell and small cell or among small cells may have limited capabilities in terms of capacity and latency. Thus, when a UE is configured with dual connectivity, it is natural to apply procedures as if the UE is associated with two eNBs individually or separately.

Based on these observations, this disclosure provides discussions as to the initial cell association procedure in case UEs support dual connectivity.

Cell Search

From a UE perspective, with dual connectivity scenario, it is natural to see more than one strong signal from different frequencies (such as one from macro layer and others from small cell layer). Since it is desirable to be associated with macro layer first than associated with small cell layer from mobility and offered capabilities perspective, mechanisms to enable macro layer discovered first or attempted for the association first would be necessary.

Firstly, a priority list can be used where high priority is given to macro-layer frequencies, so that macro-layer can be associated first. Another approach is to allow eNB to transmit its coverage capability such that a UE may select higher coverage layer such as macro layer as C-Plane carrier unless there is qualified macro cell discovered. Third approach is to transmit discovery signal which is different from PSS/SSS/CRS from cells in small cell layer mainly used for U-Plane offloading such that UEs cannot discover the cells in small cell layer.

Once a UE is associated with macro layer, if UE is capable of supporting dual connectivity, the serving cell may configure another connection. In terms of selecting another eNB for dual connectivity, a couple of selection criteria can be considered such as (1) or (2).

(1) Serving cell may select the strongest cell among cells in the frequency configured by the serving cell. In this case, serving cell gives one or more candidate frequencies (and also potential cell IDs to look up and the associated discovery signal configuration information) to the UE for search and UE reports measurement reports on those frequencies. The serving cell may select the strongest cell or good quality cell with consideration of load and other capabilities. In this case, the serving cell may inform the UE of the selected cell potentially along with system information for the selected cell so that the UE can initiate RACH procedure to the candidate cell. This procedure would be similar to network-controlled UE-assisted handover procedure except that a UE is not hand-over to the candidate cell. Instead, a UE is associated with two cells. Thus, the necessary procedure would be (a), (b) and (c) below.

(a) Indicate neighboring cell to enable the UE to search and measure a cell: In case of cell on/off operation, it may be necessary to indicate neighboring cell for UE search and measurement. If discovery signal is transmitted, instead of indication on neighbor cell, discovery signal information may be given to the UE.

(b) For inter-frequency measurement, at least carrier-frequencies need to be indicated.

(c) Once the target cell is identified, (i) serving cell commands "configuration of SeNB or SuperSCell", (ii) serving cell forwards the necessary information to target eNB (such as RRC context including C-RNTI), (iii) UE accesses the target cell via RACH following a contention-free procedure using a dedicated RACH preamble or following a contention-based procedure if dedicated RACH preambles are not available, and (iv) if the RACH procedure towards the target cell is not successful within a certain time, the UE indicates configuration failure to the serving cell. For example, SCell may added contention-based when UE accesses the SCell via RACH following contention-based procedure i.e. RACH preamble which is not dedicated is used for SCell configuration.

(2) UE may select the best cell: If this is used, serving cell may transmit a list of frequencies and/or cell ID and/or discovery signal related information to the UE and the UE selects the best cell for the dual connectivity. This procedure is similar to cell reselection procedure. In this case, RACH procedure will be based on contention-based only where the UE will be configured with temporary C-RNTI via RAR, and C-RNTI may be forwarded by the serving cell or UE to the target eNB.

RACH Procedure

When a UE transmits message3 (Msg3, i.e. scheduled UL transmission) in random access process, if PRACH procedure is with SeNB, Super SCell or SCell, it may scramble Msg with C-RNTI instead of temp C-RNTI even though RAR from SeNB or Super SCell may assign temp C-RNTI. Super SCell is a carrier to which UE transmits PUCCH and the anchor carrier in SeNB.

This is to address the case where contention-based PRACH is performed for Super SCell or SeNB or SCell, SeNB may not know whether the PRACH comes from a specific UE, thus it will assign temporary C-RNTI.

However, C-RNTI is desirably same across all the carriers configured to the UE, thus, it would be desirable to scramble Msg3 with C-RNTI if a UE is configured with C-RNTI (i.e., it has cell association already). Or, it may scramble Msg3 with temporary C-RNTI and include C-RNTI in Msg3 itself or inform C-RNTI via other means. Alternatively, a UE may be configured with different C-RNTI between connections in which case, configured C-RNTI by SeNB should be informed to the C-Plane responsible eNB such that the mapping between two C-RNTIs are maintained. C-RNTI configured by C-Plane may also be informed to SeNB as well.

Radio Link Failure at Super SCell

As cross-eNB scheduling may not be easily achievable, it is important to perform radio link monitoring measurement and determine radio link failure for the SeNB or Super SCell to which UE may transmits PUCCH. Assuming SeNB configures more than one carrier, let's call the Super SCell as the carrier to which UE transmits PUCCH and the anchor carrier in SeNB. A UE is configured to perform radio link monitoring (RLM) on the Super SCell. Once, RLM occurs, it may first inform the C-Plane serving cell (i.e., PCell). If there is more than one carrier activated in SeNB, PCell may reconfigure Super SCell with SCell which has the lowest SCell index. Before RLM occurs, SeNB may also reconfigure Super SCell among carriers available to the UE based on quality.

The procedure of change of Super SCell is similar to RRC Reconnection (similar to SCell re-association, not hand-over procedure). Once Super SCell changes, RRC reconfiguration is performed to change the configuration and also RACH procedure may be performed. If there is no appropriate cell is identified for Super SCell switch, a UE is de-attached from the SeNB and cell search and measurement for a new target SeNB may be initiated by PCell.

Period of RLM

If RLM is necessary for a cell which performs cell on/off operation, RLM period may need to be changed. If RLM is based on discovery signal, the period would be m*discovery signal transmission period where m can be such as 20 and discovery signal transmission period is the interval between two consecutive discovery signals if DRX is not configured.

If RLM is based on other signal, the period would be m*interval of RLM reference signal (RS) if DRX is not configured. For instance RLM RS can be CRS, then the interval of consecutive CRS transmission may be used for RLM period.

When radio link failure (RLF) occurs for a cell operating on/off, it should be informed back to PCell instead of triggering T310. If DRX is configured, requirement on DRX may be used.

If discovery signal is used for RLM, UE is supposed to read discovery signals at least once per each DRX cycle if DRX cycle is longer than discovery signal interval. Otherwise, a UE is supposed to read discovery signals according to discovery signal intervals. Thus, the period would be max {k*DRX cycle, m*discovery interval} where k is determined in 3GPP TS 36.133 depending on DRX cycle.

For other RS used for RLM such as CRS, a UE may be supposed to perform at least once RLM per DRX cycle, and thus the period is same as requirement in TS 36.133 7.6.2.2.

The methods and apparatuses mentioned in this section can be applied to SCell performing on/off as well.

In inter-node resource aggregation, it is likely that higher layer is configured separate per node and thus from physical layer perspective, two or more higher layers are configured where MAC/PHY interface functionalities are performed separately for each higher layer. Thus, all the functionalities may be managed and configured separately unless interaction between two nodes would be necessary. For supporting this concept, it is likely that separate parameters on power configuration, MBSFN configurations, PUCCH resource, etc are configured per each node or per each carrier group. This disclosure provides discussion as to how to perform radio monitoring measurement and reports to maintain inter-node resource aggregation effectively in such environments.

Before going in detail, first, the procedure to assign SeNB (S-PCell) is explained and the necessary functionalities are described.

Figure 7:
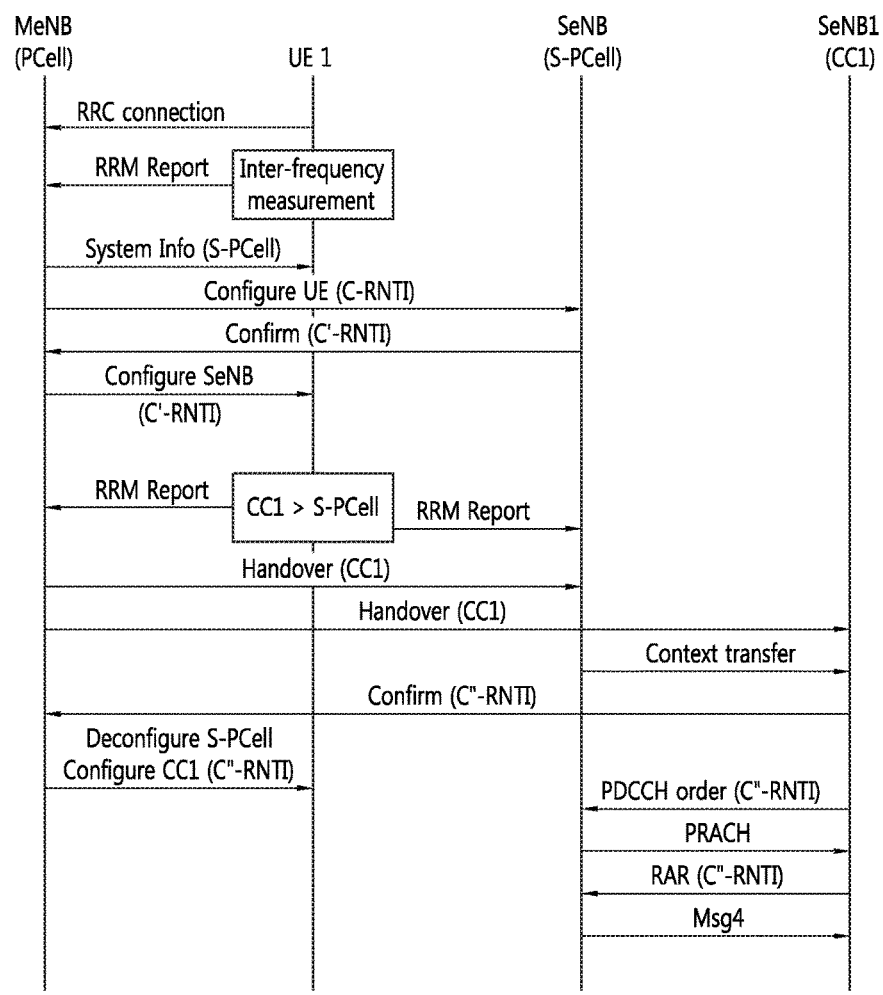
FIG. 7 is an example of initial access for SeNB according to invention(s) in this disclosure.

FIG. 7 is an example of initial access for SeNB according to invention(s) in this disclosure.

FIG. 7 describes transmission and reception of information between entities such as MeNB, SeNBs and UE. Referring to FIG. 7, configuration and deconfiguration may be performed with C-RNTIs from MeNB.

C-RNTI Delivery to SeNB

When two connections (or inter-node resource aggregation) are established, whether to use separate C-RNTI or same C-RNTI needs to be defined. In general, it is okay to use separate RNTI, yet, to determine the "UE" which is configured with SeNB as a SCell (or S-PCell) at PRACH procedure, information of C-RNTI can be propagated to SeNB. Or, a resource can be predefined by a special PDCCH order which can indicate the resource allocated for SeNB instead of MeNB.

Assuming S-PCell is always activated, it can be assumed that PRACH to SeNB may be triggered by PDCCH order which will be transmitted using C-RNTI where PDCCH order may or may not include the specific resource for PRACH. If C-RNTI needs to be changed (such as RNTI collision), MeNB can assign a separate C-RNTI for SeNB for the same UE as well.

The newly assigned C-RNTI for SeNB will be indicated by higher layer when SeNB is configured by MeNB (or PCell or higher layer). More specifically, this new C-RNTI may be treated as temporary C-RNTI which will be used to monitor PDCCH order and transmit Msg3.

In other words, temporary C-RNTI configured by PCell can be used for monitoring PDCCH order from SeNB for PRACH transmission.

In this case, temporary C-RNTI can be propagated to SeNB. The C-RNTI from SeNB (S-PCell) may be assigned to the UE via Msg4 (message 4 in random access procedure). In this case, SeNB may not send C-RNTI to MeNB or to UE.

It is UE behavior to monitor PDCCH order scrambled by temporary C-RNTI and transmit PRACH. If this applies, table 1 may be applied for PDCCH configured by temporary C-RNTI.

TABLE 1

| DCI format | Search Space |
| --- | --- |
| DCI format 0 | Common |
| All TMs, DCI format 1A | Common |
|  | (Note that this would not be used with PCell) |

RRC_Connected to RRC_IDLE or RRC Reestablishment:

It would be assumed that SeNB carriers will be deactivated/deconfigured when a UE switches to RRC_IDLE states or RRC_Reestablishment procedure has been triggered for PCell. Even without signaling from S-PCell, a UE can deactivate all carriers configured by SeNB and stop downlink monitoring and measurements.

RRM Report:

When dual connectivity is configured, separate RRM reporting to each eNB can be considered as higher layer is separately configured. For example, if two eNBs (MeNB and SeNB) configure CC1/CC2 and CC3/CC4 respectively, the measurement on CC1/CC2 can be reported to MeNB and measurement on CC3/CC4 may be reported to SeNB respectively following the procedure with assumption that each carrier groups have PCell-functioning cell.

However, since MeNB is in charge of control plane, further consideration of optimal feedback of RRM measurement can be considered. A few alternative approaches of RRM reporting based on event trigger may be considered as following alternatives Alt1 to Alt4.

Alt1: Measurement reporting on all carriers (all serving cells) is transmitted to MeNB and SeNB. In this example, regardless of reporting object configuration, all the reporting can be transmitted to both eNBs simultaneously. As measurement reporting requires uplink resource, this may require coordination between two eNBs, thus may not be desirable.

Alt2: Measurement reporting on all carriers is transmitted to MeNB and measurement reporting on only the configured carriers by SeNB is transmitted to SeNB. In this option, when reporting is triggered for SeNB, it can be transmitted to MeNB as well. Given that this also requires uplink resource of MeNB, instead of transmitting all the reports, further considerations to down select measurement reports can be considered as further alternatives Alt2-a to Alt2-d.

Alt2-a: Measurement reports on SeNB configured carriers are reported to MeNB.

Alt2-b: Measurement report related to only PCell-functioning carrier configured by SeNB is reported to MeNB as well. Assuming SeNB PCell-functioning (say S-PCell) activates/deactivates all the carriers controlled by SeNB, measurement reports on other carriers may not be so essential to MeNB except for S-PCell. With knowledge on S-PCell, MeNB may determine fast switch of S-PCell or deconfiguration of S-PCell or switch to other eNB for better service. Thus, measurement report on S-PCell may be reported to MeNB.

Alt2-c: Only a few events are reported to MeNB such as A3 (or similar event which indicates neighbor becomes offset better than S-PCell), A4 (or similar event which indicates neighbor becomes better than threshold), A5 (or similar event which indicates that S-PCell becomes worse than threshold1 and neighbor becomes better than threshold2). To acquire the quality of S-PCell, events related to S-PCell may be reported to MeNB. This may also include some events related to inter-RAT (radio access technology) threshold if inter-RAT dual connectivity is supported. Otherwise, it may be assumed that inter-RAT related events are not triggered nor reported regarding SeNB configured carriers. When these reports are reported, to avoid ambiguity between PCell and S-PCell, either separate events are configured and thus by event it can be differentiated or indication of S-PCell (such as flag to indicate between PCell and S-PCell) or separate container can be considered for S-PCell related reports. This applies to other alternatives as well.

Alt2-d: Create new events for reporting to MeNB in regards to SeNB configured carriers such as event C1 (SCell becomes offset better than S-PCell) or C2 (all SCell or S-PCell becomes worse than a threshold). In this option, to allow fast reaction of MeNB to switch S-PCell or to switch SeNB, a few new events can be considered and reported to MeNB if that occurs. For example, if any SCell configured in SeNB becomes much better than S-PCell, this may be triggered to MeNB for S-PCell switch. If all configured carriers in SeNB becomes worse than a threshold, this also may trigger switch of SeNB. In this case, separate container can be also considered.

Alt3—Measurement reports only to MeNB (assumed in RAN2 ): In this option, measurement reports on all carriers are reported only to MeNB. If this is used, reports, at least on trigger conditions may be reported back to SeNB either via X2 signaling (or Xn signaling) or by UE. For this option, similar to Alt2, there could be different variations such as Alt3-a to Alt3-d.

Alt3-a: No report to SeNB where indication/information to SeNB is performed via Xn or X2 interface.

Alt3-b: Reports on SCells except for S-PCell configured by SeNB can be reported to SeNB (in addition to MeNB) so that proper activation/deactivation decision can be made.

Alt3-c: Reports triggered by certain events on all carriers configured by SeNB are reported to SeNB. Trigger conditions may include A3 (or similar event which indicates neighbor becomes offset better than S-PCell), A4 (or similar event which indicates neighbor becomes better than threshold), A5 (or similar event which indicates that S-PCell becomes worse than threshold1 and neighbor becomes better than threshold2) or A6 (or similar event which indicates that neighbor becomes offset better than SCell).

Alt3-d: Reports of carriers configured by SeNB to MeNB and reports of activated carriers by SeNB to SeNB (duplicate) (check RAN2 agreements). If carriers can be activated/deactivated either by MeNB or SeNB, all reports are reported to MeNB and additionally, carriers are activated by SeNB may be reported to SeNB for deactivation decision. A variation where reports on activated carriers are reported to SeNB as well (regardless of who activated it) can be considered.

Alt4: It follows the configuration. That is, regardless of measurement object configuration, reporting may follow measurement report configuration such that if measurement objects are configured by each eNB, yet, report may be reported only to PCell for example. For example, if measurement objects are configured by both eNBs and reports are configured by MeNB only, reports will be forwarded to MeNB only.

Among Alt1 to Alt4, which alternative is used can be configured by higher layer by configuring in measurement report configuration. Also, measurement report may configure the list of frequencies or carriers to be reported to each eNB as well. In this case, a UE should follow measurement report configuration and transmit the necessary measurement reports per configuration.

Inter-Frequency Measurement:

When a UE is configured with dual connectivity, inter-frequency measurement and related reporting may be limited to MeNB. If UE needs to be configured with measurement gap in inter-frequency measurement, measurement gap is configured by PCell only.

However, this measurement can be used to determine events triggered for SeNB configured carriers as well. In other words, the single measurement gap is used for measuring all inter-frequency measurements. Alternatively, a UE may be configured with separate inter-frequency measurement, where measurement gap configuration can be accomplished separately as well where each eNB would not perform UL or DL only on the measurement gap configured by itself. For a UE with two RX capability, when SeNB is assigned/configured, measurement gap can be configured by MeNB (as well as SeNB).

If SeNB wants to acquire inter-frequency measurement, it shall configure measurement gap without assuming extra UE capability to perform inter-frequency measurement without interrupt. Besides, if inter-frequency measurements are performed for both MeNB and SeNB, the priority list or separate of frequencies are coordinated between two eNBs via backhaul.

Even when measurement gap is configured by each eNB respectively and a UE is configured with reporting inter-frequency measurement by each eNB respectively, reporting of inter-frequency measurement can have multiple approaches such as appr1 to appr4 as below. These options are also applicable to periodic RRM reporting case.

appr1—Transmitting to each eNB: Reporting on inter-frequency is performed per each eNB based on configuration. For SeNB, reports on frequencies configured by SeNB to monitor (including serving cell frequencies configured by SeNB) will be transmitted. Other reports will be transmitted to MeNB.

appr2: All reports are transmitted to MeNB and reports on frequencies configured by SeNB to monitor are transmitted to SeNB as well. In this case, MeNB receives all the reports and SeNB can receive reports on frequencies which are configured by SeNB to monitor (including serving cell frequencies configured by SeNB). A variation of appr2 (appr2') can be considered where all the reports are duplicated and transmitted to both eNBs.

appr3: All reports are transmitted only to MeNBs. That is, regardless of configuration, reports may be transmitted only to MeNB and exchange between two eNBs can be done via X2/Xn signaling.

appr4: It follows corresponding configuration. That is, regardless of measurement object configuration, reporting may follow measurement report configuration such that if measurement objects are configured by each eNB, yet, report may be reported only to PCell for example.

For RRM report in general, which approaches is used can be configured by higher layer by configuring in measurement report configuration. Also, measurement report may configure the list of frequencies or carriers to be reported to each eNB as well. In this case, a UE should follow measurement report configuration and transmit the necessary measurement reports per configuration.

Measurement Gap with Consideration of Discovery Signal

When a discovery signal is used for UE measurement on intra/inter-frequency measurement, it is expected that a new measurement gap pattern is needed. When a UE is configured with this new measurement gap pattern, the list of frequencies that this new gap pattern can be applied may be also configured, where a UE can assume that default (or legacy gap) pattern is assumed for non-listed frequencies.

This measurement gap can be also configured to UE which has capability to perform autonomous inter-frequency measurement as well as legacy measurement signals may not be available in those frequencies. If a UE can perform inter-frequency measurement without gap, no interruption of UL/DL may be assumed for this new measurement gap pattern.

Thus, indication of interruption of UL/DL may be signalled to UE along with this new measurement gap. Or, a default measurement gap for discovery signal may be assumed where the list of frequencies can be signalled only to indicate which frequencies are based on discovery signal for measurement.

Differentiation of Cell States to Determine Appropriate S-PCell Candidates

If we assume that S-PCell is configured as activated always, then S-PCell may not be able to operate cell on/off. Thus, a mechanism to ensure S-PCell maintains active state before configuring S-PCell to a UE is needed.

A simple mechanism is to allow SeNB to wake up and maintains active state for a carrier if configured as S-PCell (via hand-shaking process). Alternatively, a UE may report measurement reports along with discovery signal type (between legacy RS vs discovery signal) where a carrier transmitting discovery signal but no legacy RS (and thus UE reports discovery signal based measurement) may be assumed as "on-off" cell and will not be used for S-PCell configuration.

Aperiodic CSI Triggering and Configuration

It is allowed that CSI request field for aperiodic triggering can be shared between all carriers/serving cells configured/activated. In that case, by triggering eNB, report can be transmitted to the triggering eNB.

CSI table can specify values of CSI request field. If carriers are maintained separately, separate CSI table configuration is also feasible. In that case, more than two set of serving cells can be configured. For example, first/second sets of serving cells are applied to MeNB and third/fourth sets of serving cells can be applied to SeNB.

In other words, if SeNB triggers aperiodic CSI with '11' of CSI requesting fields, fourth set of serving cell configured by higher layer is used for reporting. When a UE is configured with SeNB, even though MeNB assigns only PCell (and thus only single cell is configured in MCG), UE should assume "2 bits" of CSI request field is used in DCI. In other words, when SeNB is configured, DCI field for CSI request would be 2 bits.

Moreover, it may be assumed that for a UE which is capable of dual connectivity, CSI request bits are always "2 bits" regardless of the number of configured carriers and regardless of UE-specific search space (USS)/common search space (CSS). Alternatively, aperiodic CSI may be confined to each eNB where CSI request field size is determined based on the number of configured carriers per each eNB or higher layer. In this case, CSI request field would be increased when a new SCell is configured only.

Thus, CSI bit would be determined based on configured carriers in a carrier group or per eNB. In this case, simultaneous aperiodic CSI request can happen in a subframe where one request per carrier group may be assumed. However, in general, the same number of CSI request can be occurred to the number of feasible uplink transmissions.

When one CSI table is used in case that each eNB can trigger aperiodic CSI request, depending on UL/DL configuration and other situations, it can happen that at least one carrier may not have valid downlink subframe and thus CSI report may be skipped.

If DL/UL configuration is maintained constantly, this case may not cause any issue since each eNB can exchange the configuration and determine which CSI reports are expected. For dynamic DL/UL configuration however can be different when flexible downlink subframe can be assumed as valid downlink subframe and thus CSI report may be reported for those carriers as well.

Thus, if a carrier can change DL/UL configuration, the number of CSI bits of aperiodic CSI report can be undetermined and thus eNB may need to perform blind detection of those. More specifically, for aperiodic CSI reporting, flexible downlink subframe may not assumed as valid downlink subframe to potentially remove the ambiguity if one CSI table is shared between two eNBs (i.e., in a dual connectivity scenario with one aperiodic CSI table). If separate CSI table is used for each eNB, flexible downlink subframe can be used for valid downlink subframe. Or alternatively, CSI triggering can be happened in common static downlink subframes between PCell and S-PCell so that ambiguity can be eliminated.

More specifically, when reporting aperiodic CSI, for carriers configured by the other eNB, measurement results used for periodic CSI feedback can be transmitted instead. In other words, for carriers configured by itself, aperiodic CSI measurement will be reported and for carriers configured by other(s), periodic CSI measurement can be reported.

Since the motivation of receiving CSI feedback for carriers configured by the other eNB is to estimate the channel quality in a relatively long-term scale, aperiodic CSI report on the other eNB's carriers may not be so useful.

As mentioned earlier, this can be done via configuring another periodic CSI reporting for other eNB's configured carriers instead. More specifically, aperiodic CSI request based on UL grant DCI format can be applied differently. For example, if CSI request triggered by DCI format 0 is applied to carriers configured by itself and triggered by DCI format 4 is applied to carriers configured by the other eNB. Or, if CSI request is triggered by common-search-space, it is applied to carriers configured by itself (or vice versa) and by USS, it is applied to carriers configured by the other eNB. Or, a set of subframes where aperiodic CSI for carriers configured by the other eNBs can be configured such that if aperiodic request occurs in those subframes, CSI reports on the other eNB's carriers are reported to MeNB.

When periodic CSI report is configured for S-PCell by MeNB, reporting type and periodicity can be configured. More specifically, a simple reporting on wide-band CQI can be used for that reporting to minimize the overhead. Since this reporting is not for data scheduling, wide-band CQI may be sufficient. Also, it may be assumed that PMI-RI reporting is disabled for this configuration or process. Or, to minimize UE impact, this period would be multiple of other periodic CSI reporting and transmit the same CSI measurement transmitted to the other eNB to MeNB if two occurrences are aligned.

To simplify the configuration, only m value can be configured if this occurs where wideband CQI is transmitted to both eNBs whenever MATH 1 is satisfied.

$$(10 \times n_f + \lfloor n_s/2 \rfloor - N_{OFFSET,CQI}) \bmod (N_{pd} \cdot m) = 0 \quad \text{<MATH 1>}$$

In MATH 1, where $N_{pd}$ is a period, m is an integer, $N_{OFFSET,CQI}$ is an offset, $n_f$ is a system frame number, and $n_s$ is a slot number within a radio frame.

SeNB Switch Decision

Changing SeNB PCell (S-PCell) brings also considerable overhead. Particularly, in small cell environments, the cases where neighbor cell quality becomes better than S-PCell would occur more frequently compared to macro scenarios.

Thus, more accurate measurement to determine a right point to switch S-PCell may be necessary which may not be covered by RRM of S-PCell. This would help for reduction of ping-pong effects or failure of hand-over (or S-PCell switch failure).

One candidate mechanism is to utilize RLM procedure which monitors the channel quality continuously. Since the mobility is handled by macro cell or PCell, the conditions to trigger RLF or similar event to indicate the quality of S-PCell becomes very poor could be different from condition of PCell.

The physical layer in the UE shall in radio frames where the radio link quality is assessed indicate out-of-sync to higher layers when the radio link quality is worse than the threshold $Q_{out}$. When the radio link quality is better than the threshold $Q_{in}$, the physical layer in the UE shall in radio frames where the radio link quality is assessed indicate in-sync to higher layers.

Since, S-PCell may be mostly configured for data offloading, the condition of $Q_{in}$ can be more relaxed than $Q_{in}$ for PCell. This can be achieved by changing $Q_{in}$ threshold or reduce N311 (number of consecutive in-sync indications) timer. Whereas $Q_{out}$ can be more tightened to allow fast decision to switch SCell when good user throughput is not achieved. This can be done for example to tighten $Q_{out}$ threshold (i.e. changing BER threshold) or tighten N310 (number of consecutive out-sync indications). In general, different threshold or conditions can be considered for S-PCell RLM.

When T310 timer (a timer for RLF) is running, a UE can be triggered to report CSI of S-PCell or carriers configured by SeNB to PCell so that MeNB may determine switch of SCell to S-PCell or switch of S-PCell to different SeNB.

In other words, when T310 is triggered for S-PCell, CSI report can be transmitted to both MeNB and SeNB. When T310 is triggered, it can be informed to both MeNB and SeNB (PCell and S-PCell) as well. This can be applied to both (T310 of PCell and T310 of S-PCell). RLF of PCell can be informed to S-PCell as well for deconfiguration or hand-over procedure of SeNB carriers. When T310 of S-PCell is triggered, UE reports CSI reports of all serving cells to both higher layers. Alternatively, when T310 of S-PCell is triggered, this can be indicated to PCell (or vice versa) and backhaul signaling can be used to exchange CSI reports. For a better handling, periodic CSI report on S-PCell can be configured by MeNB (or by PCell) as well where a UE transmits CSI report on S-PCell to MeNB per configuration.

Once T310 is triggered, both PCell and S-PCell can run T310 timer for S-PCell where release of T310 timer of S-PCell in PCell can be reset by another indication of T310-reset. If this event has not been received while T310 timer expires, PCell may assume that RLF on S-PCell occurs. To eliminate the potential delay of uplink scheduling/latency, PCell may schedule uplink grant before T310 of S-PCell expires. Thus, for T310 timer, UE behavior is as follows.

For S-PCell: ① N310 timer expires→start T310 timer ② indicate "T310 timer start" of S-PCell to PCell ③ Runs T310 timer: Reset T310 timer if N311 timer is achieved (in-sync state) and indicate "T310 timer reset" to PCell, and if expires, flag RLF of S-PCell and indicate RLF of S-PCell to PCell.

Similar procedure can be considered for PCell as well.

More particularly, it can be also considered that RLM related timer of S-PCell is managed by PCell where $Q_{in}/Q_{out}$ indication can be transmitted to PCell instead of S-PCell (or to both). In this case, different timer and/or conditions and/or threshold can be considered. The benefit of this approach is to realize the S-PCell failure point more accurately, however, it adds some overhead.

Alternatively, $Q_{in}/Q_{out}$ indication of S-PCell can be informed only to PCell as well where SeNB configures/activates/deactivates carriers only by RRM and/or CSI reports. The benefit of this approach is the simplicity where SeNB may not need to configure or handle RLM procedure separately, yet, decision of appropriate S-PCell by SeNB may not be easily achievable.

All proposed ideas provided so far in this invention are not limited to MeNB/SeNB scenario. In general, if a UE is configured with more than one carrier groups where each group may have master carrier, concepts can be applied. It is further assumed that at least one carrier group is in charge of RRC configuration and in charge of mobility handling. Furthermore, this invention assumes that carriers groups are formed only across LTE carriers. However, carriers groups can be formed across different RATs. However, in that case, handling could be more challenging. The basic concepts of measurement reporting can be used in such cases if applicable.

Figure 8:
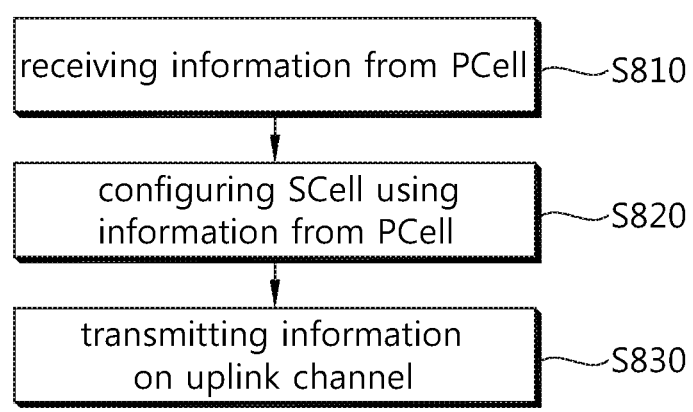
FIG. 8 is a flowchart describing operation of a UE briefly according to the invention(s) in this disclosure.

FIG. 8 is a flowchart describing operation of a UE briefly according to the invention(s) in this disclosure.

Referring to FIG. 8, the UE may receive information from PCell (S810). The information from the PCell may include C-RNTI. Corresponding to the C-RNTI from the PCell, the UE may transmit C-RNTI to the PCell. The C-RNTI from PCell and C-RNTI from the UE may be same or may be different. The C-RNTI from the UE may be transmitted to SCell by the PCell.

The UE may configure SCell using information from the PCell (S820). As explained above, the UE may configure SCell using C-RNTI in the information from PCell.

The UE may configure the SCell contention-based such that the UE may transmit non-dedicated RACH preamble. Or the UE may transmit dedicated RACH preamble for contention free configuration of SCell.

In addition, the UE may reconfigure RRC when super SCell is changed.

The UE may transmit information on uplink channel (S830). The UE may perform RLM and may report RLM to PCell and/or SCell. Various RLM reporting modes are described before.

In addition, the UE may also perform measurement on reference signal and transmit CSI report based on the measurement. In this case, the gap between measurements may be configured by the PCell.

Including described here, the detailed operations of the UE and Cells (eNBs) are same as described before.

Figure 9:
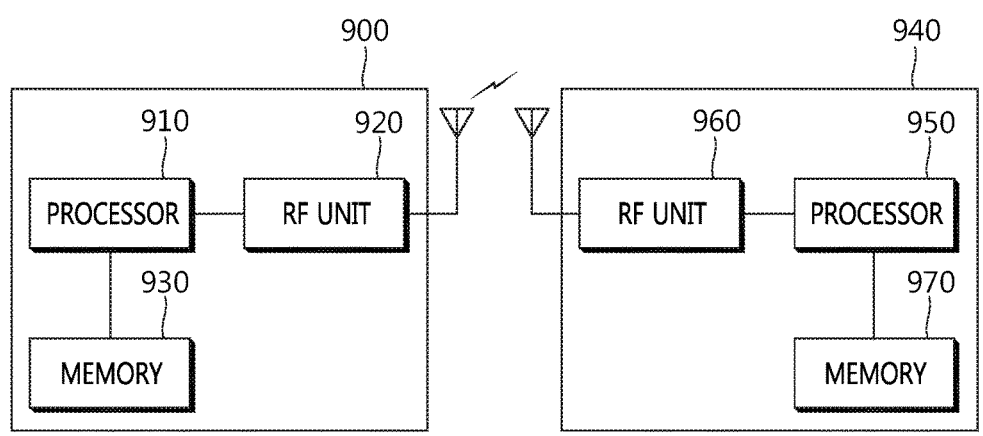
FIG. 9 is a block diagram which briefly describes a wireless communication system including an UE and a BS (eNB).

FIG. 9 is a block diagram which briefly describes a wireless communication system including an UE 900 and a BS (eNB) 940. The UE 900 and the BS 940 may operate based on the description as explained above.

In view of downlink, a transmitter may be a part of the BS 940 and a receiver may be a part of the UE 900. In view of uplink, a transmitter may be a part of the UE 900 and a receiver may be a part of the BS 940.

Referring to FIG. 9, the UE 900 may include a processor 910, a radio frequency (RF) unit 920, and a memory 930.

The processor 910 may be configured to implement proposed procedures and/or methods described in this application. For example, the processor 910 operatively coupled to the RF unit 920 and the memory 930. The processor 910 is configured for transmitting/receiving signals via the RF unit 920 based on a scheduling for UL and/or DL.

The processor 910 configures the SCell using information received from the PCell. For configuring the SCell, the processor 910 may perform contention-based procedure such that the processor transmits non-dedicated RACH preamble, etc.

The processor 910 may perform RLM and transmit RLM report via RF unit 920. In addition, the processor 910 may perform measurement on reference signals with a measurement gap. The measurement gap can be configured by PCell.

The Processor 910 may receive C-RNTI form PCell via the RF unit 920. Responding to the C-RNTI form the PCell, the processor 910 may transmit C-RNTI to the PCell via the RF unit 920. The C-RNTI from PCell and C-RNTI from the UE may be same or may be different. The C-RNTI from the UE may be transmitted to SCell by the PCell. The C-RNTI from the processor 910 may be transmitted from the PCell to the SCell before the SCell is configured.

The processor 910 also may reconfigure radio resource control (RRC) when super SCell is changed.

The RF unit 920 may transmit and/or receive information (signal) on uplink channel and/or downlink channel. For example, the RF unit 920 may receives and transmit C-RNTI, RLM report, CSI report. In some cases, the RF unit 920 may transmit RLM report to the PCell and the RLM report may be transmit to the SCell when some triggering conditions are satisfied. In another example, the RF unit 920 may transmit RLM reports on all carriers to MeNB and RLM report on carrier activated by SeNB to the SeNB.

The memory 930 is coupled with the processor 910 and stores a variety of information to operate the processor 910.

The BS 940 may include a processor 950, a radio frequency (RF) unit 960, and a memory 970.

The processor 950 may be configured to implement proposed procedures and/or methods described in this application. For example, the processor 950 operatively coupled to the RF unit 960 and the memory 970. The processor 950 is configured for transmitting/receiving signals via the RF unit 960 based on a scheduling for UL and/or DL.

The processor 950 may transmit information such as C-RNTI to the UE 900 and received information corresponding to it via the RF unit 960 when the BS 940 is a PCell. In this case, the processor 950 may transmit information from the UE, which includes C-RNTI, to SCell. The connection between the UE and SCell can be established with the C-RNTI.

When the BS 940 is a SCell, the processor 950 may receive C-RNTI from PCell via RF UNIT 960. In this case, the processor 950 may configure with the UE 900 based on the received C-RNTI.

During configuring SCell, contention-based procedure can be performed such that the processor 950 may receive non-dedicated RACH preamble from the UE 900.

The processor 950 may receive RLM report via RF unit 960. According to whether the BS 940 is PCell or SCell, the RLM report can be delivered differently. In addition, the processor 950 may configure measurement gap when the BS 940 is a PCell. The processor 950 also may perform RRC reconfiguration when super SCell is changed.

The RF unit 960 may transmit and/or receive information (signal) on uplink channel and/or downlink channel. For example, the RF unit 920 may transmit/receive C-RNTI, RLM report, CSI report. In some cases, the RF unit 920 may transmit RLM report to the SCell when the BS 940 is PCell and some triggering conditions are satisfied. Various example to treat RLM reports were introduced before in this disclosure.

The memory 970 is coupled with the processor 950 and stores a variety of information to operate the processor 950.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

What is claimed is:

1. A method for communicating with a macro cell evolved node-B (eNB) (MeNB) and a small cell eNB (SeNB) by a user equipment (UE) in a wireless communication system, the method comprising:
receiving information on a downlink channel from a primary cell (PCell) of the MeNB, wherein the information includes a first cell radio network temporary identity (C-RNTI);
configuring a secondary cell (SCell) by using the information received from the PCell of the MeNB, wherein the configured SCell is always activated;
after a C-RNTI collision is detected, receiving a second C-RNTI, corresponding to the first C-RNTI, for the SeNB from the PCell of the MeNB;
monitoring a physical downlink control channel (PDCCH) order transmitted from the SeNB by using the second C-RNTI, wherein the PDCCH order triggers the UE to transmit a random access channel (RACH) preamble to the SeNB;
transmitting the RACH preamble to the SeNB; and
transmitting information on an uplink channel,
wherein transmitting the information comprises transmitting a message3 (Msg3) in a random access procedure to the SeNB by using the second C-RNTI,
wherein the second C-RNTI is treated as a temporary C-RNTI for monitoring the PDCCH order transmitted from the SeNB and transmitting the Msg3 to the SeNB.

2. The method of claim 1, wherein the RACH preamble is a non-dedicated RACH preamble.

3. The method of claim 1, wherein the step of transmitting information further includes transmitting a radio link monitoring (RLM) report to the PCell of the MeNB, and
wherein the MeNB transmits the RLM report to the SeNB.

4. The method of claim 1, wherein the step of transmitting information further includes transmitting a radio link monitoring (RLM) report, and
wherein RLM reports on all carriers are transmitted to the MeNB and an RLM report on a carrier activated by the SeNB is transmitted to the SeNB.

5. The method of claim 1, further comprising performing measurement on reference signals with a gap between measurements,
wherein the gap is configured by the PCell of the MeNB.

6. The method of claim 1, further comprising changing a super secondary cell (SCell),
wherein radio resource control (RRC) is reconfigured when the super SCell is changed, and
wherein the super SCell is a carrier to which the UE transmits a physical uplink control channel (PUCCH) and an anchor carrier in the SeNB.

7. A user equipment (UE) for communicating with a macro cell evolved Node-B (eNB) (MeNB) and a small cell eNB (SeNB) in a wireless communication system, the UE comprising:
a radio frequency (RF) unit; and
a processor operatively coupled to the RF unit, wherein the processor:
controls the RF unit to receive information on a downlink channel from a primary cell (PCell) of the MeNB, wherein the information includes a first cell radio network temporary identity (C-RNTI);
configures a secondary cell (SCell) by using the information received from the PCell of the MeNB, wherein the configured SCell is always activated;
after a C-RNTI collision is detected, controls the RF unit to receive a second C-RNTI, corresponding to the first C-RNTI, for the SeNB from the PCell of the MeNB;
controls the RF unit to monitor a physical downlink control channel (PDCCH) order transmitted from the SeNB by using the second C-RNTI, wherein the PDCCH order triggers the UE to transmit a random access channel (RACH) preamble to the SeNB;
controls the RF unit to transmit the RACH preamble to the SeNB; and
controls the RF unit to transmit information on an uplink channel,
wherein the processor controls the RF unit to transmit information by controlling the RF unit to transmit a message3 (Msg3) in a random access procedure to the SeNB by using the second C-RNTI,
wherein the second C-RNTI is treated as a temporary C-RNTI for monitoring the PDCCH order transmitted from the SeNB and transmitting the Msg3 to the SeNB.

8. The UE of claim 7, wherein the RACH preamble is a non-dedicated RACH preamble.

9. The UE of claim 7, wherein the processor controls the RF unit to transmit information by further controlling the RF unit to transmit a radio link monitoring (RLM) report to the PCell of the MeNB, and
wherein the MeNB transmits the RLM report to the SeNB.

10. The UE of claim 7, wherein the processor controls the RF unit to transmit information by further controlling the RF unit to transmit a radio link monitoring (RLM) report, and
wherein RLM reports on all carriers are transmitted to the MeNB and an RLM report on a carrier activated by the SeNB is transmitted to the SeNB.

11. The UE of claim 7, wherein the processor further performs measurement on reference signals with a gap between measurements, and
wherein the gap is configured by the PCell of the MeNB.

12. The UE of claim 7, wherein the processor further changes a super secondary cell (SCell),
wherein radio resource control (RRC) is reconfigured when the super SCell is changed, and
wherein the super SCell is a carrier to which the UE transmits a physical uplink control channel (PUCCH) and an anchor carrier in the SeNB.

* * * * *